US012571137B2

(12) United States Patent　　　　(10) Patent No.: US 12,571,137 B2
Kim et al.　　　　　　　　　　　　(45) Date of Patent: Mar. 10, 2026

(54) TWO LAYER FABRIC AND ARTICLES COMPRISING THE SAME

(71) Applicant: KOLON INDUSTRIES, INC., Seoul (KR)

(72) Inventors: Hyo Eun Kim, Seoul (KR); Il Chung, Seoul (KR); Ki Jeong Kim, Seoul (KR); Jin Wook Heo, Seoul (KR); Ji Hoon Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 316 days.

(21) Appl. No.: 18/252,544

(22) PCT Filed: Dec. 23, 2021

(86) PCT No.: PCT/KR2021/019704
§ 371 (c)(1),
(2) Date: May 11, 2023

(87) PCT Pub. No.: WO2022/145872
PCT Pub. Date: Jul. 7, 2022

(65) Prior Publication Data
US 2024/0018701 A1　　Jan. 18, 2024

(30) Foreign Application Priority Data

Dec. 29, 2020　(KR) ........................ 10-2020-0186478
Dec. 22, 2021　(KR) ........................ 10-2021-0184478

(51) Int. Cl.
*D03D 13/00*　　(2006.01)
*B60R 21/235*　　(2006.01)
*D03D 1/02*　　(2006.01)
*D03D 11/00*　　(2006.01)
*D03D 15/283*　　(2021.01)
*D03D 15/30*　　(2021.01)
*D06N 3/00*　　(2006.01)
*D06N 3/14*　　(2006.01)

(52) U.S. Cl.
CPC ......... *D03D 13/004* (2013.01); *B60R 21/235* (2013.01); *D03D 1/02* (2013.01); *D03D 11/00* (2013.01); *D03D 13/008* (2013.01); *D03D 15/283* (2021.01); *D03D 15/30* (2021.01); *D06N 3/0006* (2013.01); *D06N 3/0013* (2013.01); *D06N 3/14* (2013.01); *D06N 2201/02* (2013.01); *D10B 2331/04* (2013.01); *D10B 2401/063* (2013.01); *D10B 2505/124* (2013.01)

(58) Field of Classification Search
None
See application file for complete search history.

(56) References Cited

U.S. PATENT DOCUMENTS

2008/0302438 A1　12/2008　Sollars, Jr.
2014/0021705 A1　1/2014　Youn

FOREIGN PATENT DOCUMENTS

CN　　1501994 A　　6/2004
CN　　103582726 A　　2/2014
(Continued)

OTHER PUBLICATIONS

International Search Report Dated Apr. 5, 2022.
The Office Action dated Apr. 4, 2025, of the corresponding Chinese Patent Application.

*Primary Examiner* — Arti Singh-Pandey
(74) *Attorney, Agent, or Firm* — Harvest IP Law, LLP

(57) ABSTRACT

The present application relates to a two-layer fabric and an article including the same.

12 Claims, 6 Drawing Sheets

(56) References Cited

FOREIGN PATENT DOCUMENTS

| | | | |
|---|---|---|---|
| CN | 106489000 | A | 3/2017 |
| JP | 3207204 | B2 | 9/2001 |
| JP | 2005105438 | A | 4/2005 |
| JP | 2014-113989 | A | 6/2014 |
| JP | 2014-514470 | A | 6/2014 |
| JP | 2017-512917 | A | 5/2017 |
| JP | 2017-519125 | A | 7/2017 |
| JP | 2018-114958 | A | 7/2018 |
| KR | 19980056782 | A | 9/1998 |
| KR | 20120112219 | A | 10/2012 |
| KR | 20150048768 | A | 5/2015 |
| KR | 20170075525 | A | 7/2017 |
| KR | 101910177 | B1 | 10/2018 |
| KR | 20180121200 | A | 11/2018 |
| WO | 2009-008350 | A1 | 1/2009 |

【FIG. 1】
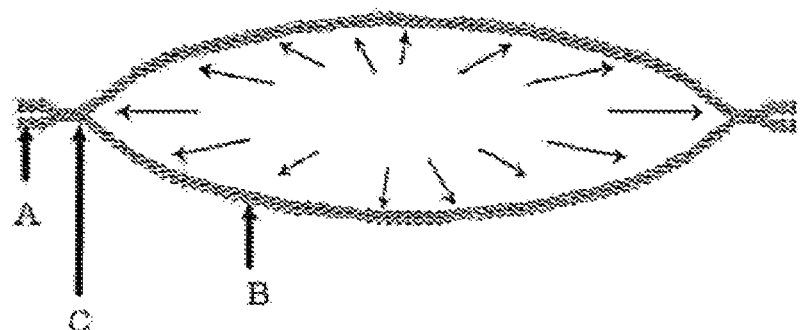
【FIG. 2a】
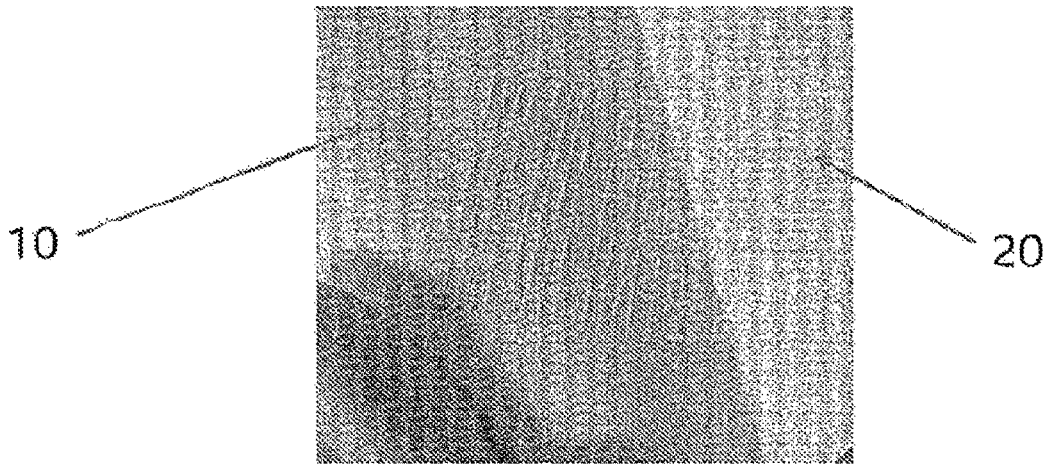

【FIG. 2b】
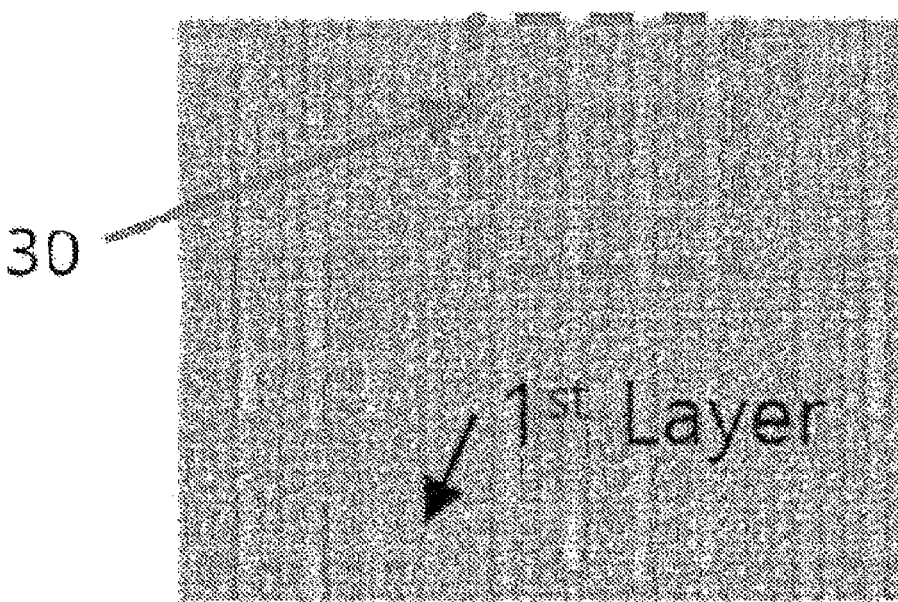
【FIG. 2c】
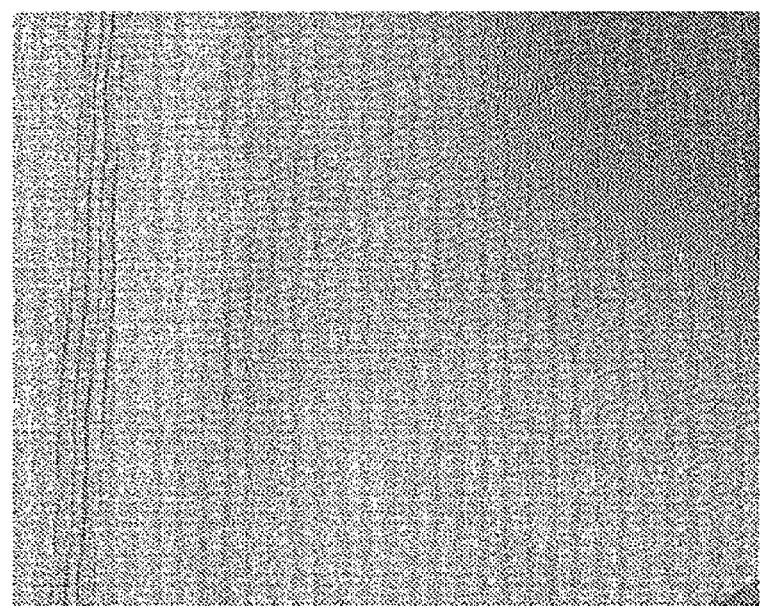

【FIG. 3a】
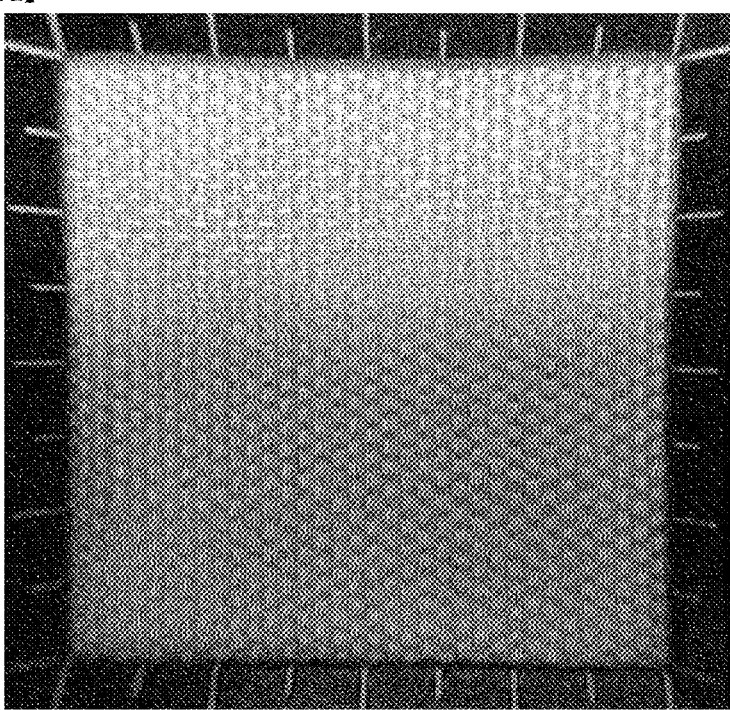
【FIG. 3b】
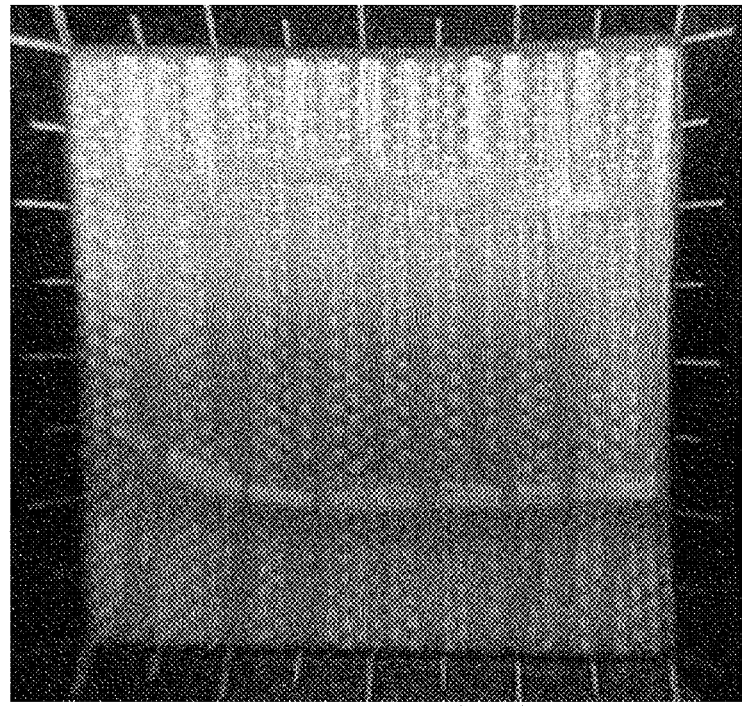

【FIG. 4】
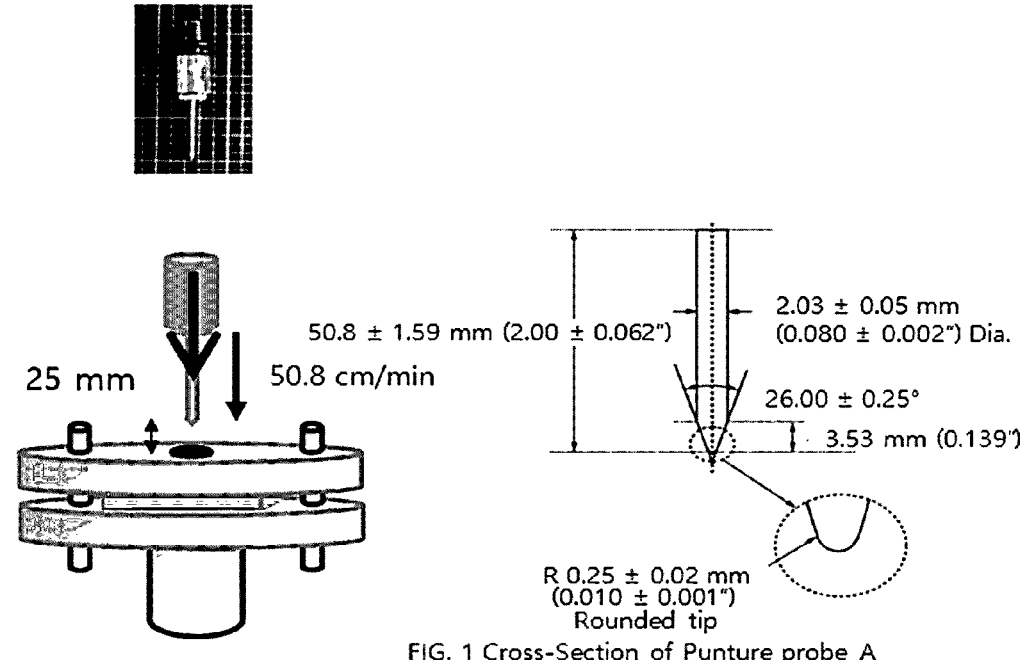
50.8 ± 1.59 mm (2.00 ± 0.062")
25 mm    50.8 cm/min
2.03 ± 0.05 mm
(0.080 ± 0.002") Dia.
26.00 ± 0.25°
3.53 mm (0.139")
R 0.25 ± 0.02 mm
(0.010 ± 0.001")
Rounded tip
FIG. 1 Cross-Section of Punture probe A
PUNCTURE GUIDE HOLES
10 mm
(0.390") DIA.
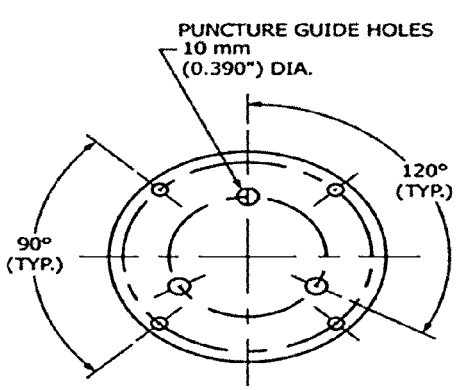
120°
(TYP.)
90°
(TYP.)

【FIG. 5a】
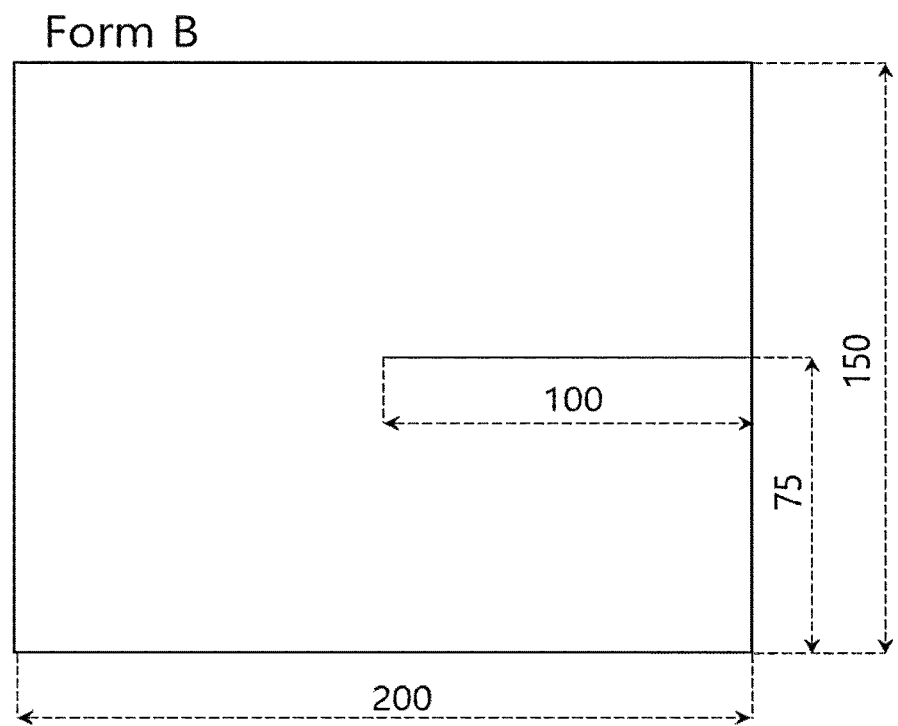

【FIG. 5b】
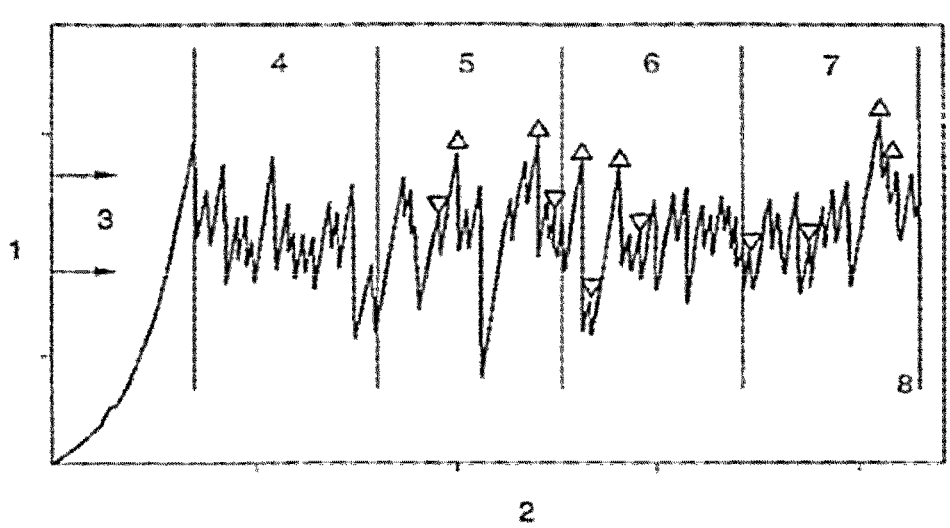
Sample calculation of tear force
1. Force
2. Direction of tear (trace length)
3. Approx. medium peak range
4. Ignore
5. Subsection 1
6. Subsection 2
7. Subsection 3
8. End of tear

TWO LAYER FABRIC AND ARTICLES COMPRISING THE SAME

CROSS-REFERENCE TO RELATED APPLICATION(S)

This application claims the benefit of Korean Patent Application No. 10-2020-0186478 filed on Dec. 29, 2020 and Korean Patent Application No. 10-2021-0184478 filed on Dec. 22, 2021 in the Korean Intellectual Property Office, the disclosures of which are incorporated herein by reference in their entirety.

TECHNICAL FIELD

The present application relates to a two-layer fabric and an article including the same. More particularly, the present disclosure relates to a gas inflatable two-layer fabric having a protrusion pattern, and an article (e.g., airbag, life jacket, etc.) including the two-layer fabric.

BACKGROUND ART

Airbag is an apparatus for protecting vehicle users by exploding gunpowder after detecting crash impact with a sensor, and expanding a gas supplied to the inside of an airbag cushion, when an external force due to a collision or the like is applied to the vehicle.

In a situation where the airbag is deployed, the airbag may be damaged by broken glass windows or car interiors. Particularly, when a vehicle rolls over, the side curtain airbags located near the glass windows are most damaged, and the airbag damaged by glass fragments or the like in this way does not sufficiently perform its original function.

In conventional technologies, the impact resistance or the like of the airbag was reinforced by backing a reinforcement fabric onto an airbag through sewing or adhesion, but such a method deteriorates the package or folding performance of the airbag, and also generates an additional cost.

DETAILED DESCRIPTION OF THE INVENTION

Technical Problem

It is one object of the present application to provide a gas (e.g., air) inflatable two-layer fabric.

It is another object of the present application to provide a gas inflatable two-layer fabric having improved impact durability and tear strength.

It is another object of the present application to provide an article (e.g., airbag, life jacket, etc.) comprising the two-layer fabric.

It is yet another object of the present application to provide an airbag having excellent package or folding performance.

It is a further object of the present application to provide an airbag having excellent weaving efficiency or processability, such as not further requiring joining (adding, backing or padding) of reinforcement fabric or adhesion between fabrics.

The above and other objects of the present application can be completely achieved by the present application described below.

Technical Solution

In one embodiment, the present disclosure relates to a two-layer fabric. The two-layer fabric comprises a first fabric layer (L1) and a second fabric layer (L2).

The first fabric layer (L1) has a predetermined pattern (P1), and the second fabric layer (L2) has a predetermined pattern (P2). The pattern may mean a fabric weaving pattern or a visually recognized fabric weave pattern.

The two-layer fabric can be used for airbags and has gas inflatability. For example, the two-layer fabric may have gas inflatability by joining the two fabric layers (L1, L2). Specifically, referring to FIG. 1, the two-layer fabric may be separated into a non-inflation part (A) and an inflation part (B) with the joint part (C) where the first fabric layer and the second fabric layer are joined as a boundary. That is, the two-layer fabric may include a non-inflation part (A), an inflation part (B) and a joint part (C), or may form a non-inflation part (A), an inflation part (B) and a joint part (C). The inflation part formed as above may have sealing property to a degree that can have gas inflatability. For example, the joint part can be configured so as to prevent the gas that causes gas inflation from escaping between two separate fabric layers, and also withstand the pressure of the expanding gas. Thereby, when gas flows in, the inflation part can be inflated, thereby protecting the user from an external impact.

The joining method between the first fabric layer and the second fabric layer is not particularly limited.

In one embodiment, the second fabric layer and the first fabric layer are manufactured by one-piece woven process, wherein the separated two fabrics (layers) can be woven at the same time, and these fabric layers can be joined at the binding point (or binding part). At this time, the binding point (or binding part) corresponds to the joint part (C).

In another embodiment, the second fabric layer and the first fabric layer can be manufactured independently of each other, and then a part of the fabric layer can be joined through a method of sewing, fusion, or adhesion. The joining region or point between the fabric layers corresponds to the joint part (C).

Considering the simplification of the process and the reduction of manufacturing cost, it is preferable to manufacture the two-layer fabric by one-piece woven process.

The two-layer fabric of the present application has a protrusion pattern (P3). Specifically, the protrusion pattern (P3) integrally formed with the fabric layer is formed on one or more surfaces of the fabric layers (L1, L2). In this regard, "the protrusion pattern is integrally formed with the fabric layer" means that some of the warp or weft threads used for weaving the fabric layers (L1, L2) or their patterns (P1, P2) are used to form the protrusion pattern (P3), and then, it is again used to weave the patterns (P1, P2) of the fabric layers. Such weaving can be performed, for example, using a jacquard machine, and specifically, the weaving can be performed by an OPW weaving process using a jacquard machine. Therefore, according to the present application, no additional steps such as backing (or padding) a reinforcement fabric or attaching an additional pattern after manufacturing the fabric layer are required.

The position at which the protrusion pattern (P3) is positioned on the surface of the fabric layers (L1, L2) is not particularly limited, but for example, the protrusion pattern (P3) can be locally formed on a specific part (region) of the fabric where a strong impact is expected to be applied at the time of airbag inflation. Thereby, as confirmed in Experimental Examples below, the protrusion pattern (P3) complements the pressure resistance performance of the local parts (regions) of the fabric layers (L1, L2), which can be breakpoints when the airbag is deployed, and prevent the fabric layer from being torn.

In one embodiment, the protrusion pattern (P3) can be formed on one surface on which the fabric layers (L1, L2) face each other, among the surfaces forming the fabric layers (L1, L2). Referring to FIG. 1, the protrusion pattern (P3) can be formed on one surface (i.e., the inner surface) of the fabric layers (L1, L2) forming the inside of the inflation part (B) through which gas flows in and expands. In another embodiment, the protrusion pattern (P3) may be formed on a surface opposite to the inside surface of each of the fabric layers (L1, L2), that is, on the outside surface. In another embodiment, the protrusion pattern (P3) may be formed on both the inside surface and the outside surface of the fabric layers (L1, L2).

Generally, a resin coating layer may be formed on one surface of the fabric layer as described below, but in terms of preventing coating imbalance, the protrusion pattern (P3) is preferably formed on a surface opposite to the surface on which the resin coating layer is formed. For example, when a resin coating layer is formed on the outer surface of the two-layer fabric, it is preferable that the protrusion pattern (P3) is formed on the inside surface of the two-layer fabric.

In a specific embodiment of the present application, the protrusion patterns (P3) can be formed by one or more numbers on the surface of any one or more of the fabric layers (L1, L2). Alternatively, the protrusion patterns (P3) can be formed by two or more numbers on the surface of any one or more of the fabric layers (L1, L2).

When a plurality of protrusion patterns are formed on the fabric layers, each protrusion pattern can be visually distinguished. For example, the shape of each protrusion pattern, the area occupied by them, and/or the interval between them can be visually confirmed, so that each protrusion pattern can be distinguished (see FIG. 2a).

The plurality of protrusion patterns as described above can be formed repeatedly on the fabric layer while having the same or different shapes.

In one embodiment, the protrusion pattern (P3) may be formed to have an interval size (or a size that occupies the interval) of at least 5 to 100 threads. At this time, the thread means one line (or a strand) of the warp and weft threads forming the patterns (P1, P2) of the fabric layers (L1, L2). For example, when the protrusion pattern is formed with the above thread interval size, the area occupied by the protrusion pattern may be a polygon (e.g., quadrangle) consisting of at least five threads in each of the warp direction and the weft direction or an area equivalent thereto (see FIG. 2b).

Specifically, the protrusion pattern (P3) may be formed, for example, with an interval size (or a size that occupies the interval) of 10 threads or more, 15 threads or more, 20 threads or more, 25 threads or more, 30 threads or more, 35 threads or more, 40 threads or more, or 45 threads or more. Further, the upper limit of the interval size (or the size occupied by the protrusion pattern expressed in threads) may be, for example, 95 threads or less, 90 threads or less, 85 threads or less, 80 threads or less, 75 threads or less, 70 threads or less, 65 threads or less, 60 threads or less, 55 threads or less, 50 threads or less, 45 threads or less, 40 threads or less, 35 threads or less, 30 threads or less, or 25 threads or less. When the size at which the protrusion pattern is formed is adjusted within the thread interval range, it is possible to prevent deterioration of weaving performance due to tension imbalance and secure the impact durability of the two-layer fabric.

The thread interval of the warp and weft threads forming the protrusion pattern may be adjusted independently of each other within the above range.

In one embodiment, the protrusion patterns P3 may be formed separately at a predetermined interval from each other. Specifically, the plurality of protrusion patterns (P3) formed on one or more surfaces of the fabric layers (L1, L2) may be formed at an interval of at least 5 to 50 threads. For example, the interval between the protrusion patterns (P3) may be 10 threads or more, 15 threads or more, 20 threads or more, 25 threads or more, or 30 threads or more, and the upper limit thereof may be, for example, 45 threads or less, 40 threads or less, 35 threads or less, 30 threads or less, 25 threads or less, 20 threads or less, 15 threads or less, or 10 threads or less.

In another embodiment, the protrusion patterns (P3) may be repeated at regular intervals. Specifically, the plurality of protrusion patterns (P3) formed on one or more surfaces of the fabric layers (L1, L2) may be repeatedly formed at an interval of at least 5 to 50 threads.

In one embodiment, the patterns (P1, P2) of the fabric layer on which the protrusion pattern (P3) is formed may be the same as or different from each other.

The specific shape (or type) of the fabric layer patterns (P1, P2) is not particularly limited. For example, the fabric layers (L1, L2) may have each independently patterns (P1, P2) that are a 1×1 weave, a 2×2 weave, a 3×3 weave, a satin weave, a warp rib weave, a weft rib weave, or its mixed weave.

In one embodiment, the density of the warp and weft threads forming the patterns (P1, P2) of the fabric layers (L1, L2) may be in the range of 40 to 80 th/inch. Specifically, the density of the warp and weft threads forming the fabric layer patterns (P1, P2) may be, for example, 46 th/inch or more, 47 th/inch or more, 48 th/inch or more, 49 th/inch or more, 50 th/inch or more, 51 th/inch or more, 52 th/inch or more, 53 th/inch or more, 54 th/inch or more or 55 th/inch or more. Further, the upper limit thereof may be, for example, 70 th/inch or less, 65 th/inch or less, or 60 th/inch or less, specifically, 59 th/inch or less, 58 th/inch or less, 57 th/inch or less, 56 th/inch or less, 55 th/inch or less, 54 th/inch or less, 53 th/inch or less, 52 th/inch or less, 51 th/inch or less or 50 th/inch or less. When the density is less than the above range, it may be difficult to secure airtightness and mechanical strength related to air inflation. Further, when the density exceeds the above range, it is difficult to secure the packaging characteristic or foldability of the airbag. The density can be measured according to ISO 7211-2 (Section 3.07), but is not particularly limited thereto.

The protrusion pattern (P3) may be the same as or different from the patterns (P1, P2) of the fabric layers. When the patterns are the same, the protrusion patterns (P3) may be woven more loosely than the patterns (P1, P2) of the fabric layer.

In one embodiment, the protrusion patterns (P3) may have a mesh shape (see FIG. 2a, 2b or 3b). At this time, the mesh shape may mean, for example, a shape in which two or more warp threads arranged side by side in the warp direction intersect with two or more weft threads arranged side by side in the weft direction. The mesh shape may be used interchangeably with a net shape. Such a mesh shape can improve the impact durability of the two-layer fabric and the like, as confirmed in Experimental Examples below, without reducing the weaving efficiency of the two-layer fabric.

In one embodiment, the density of the warp and weft threads forming the protrusion pattern (P3) may be smaller than the density of the warp and weft threads forming the fabric layer patterns (P1, P2). For example, the density of the warp and weft threads forming the protrusion pattern (P3) may be 20 th/inch or less, 15 th/inch or less, 10 th/inch or less, or 5 th/inch or less. Specifically, the upper limit of the density of the warp and weft threads forming the protrusion pattern (P3) may be, for example, 4 th/inch or less or 3 th/inch or less. Within the above density range, it is possible to prevent deterioration of weaving performance due to tension imbalance, and ensure the impact durability of the two-layer fabric. The lower limit of the density of the warp and weft threads forming the protrusion pattern (P3) may be, for example, 1 th/inch or more.

The type of fiber used for weaving the patterns P1, P2 and P3 is not particularly limited. For example, at least one fiber selected among a polyester fiber, a nylon fiber, an aramid fiber, a polyketone fiber, a carbon fiber, and a cellulose fiber can be used for the formation of the patterns P1, P2 and P3.

In one embodiment, the fineness of the fiber may be within the range of 300 to 1500 dtex. When the fineness range is satisfied, the lightweight property can be secured along with appropriate mechanical strength.

In one embodiment, the two-layer fabric further includes a resin coating layer for the fabric layer, in order to reduce air leakage in the inflation part of the two-layer fabric. Specifically, the resin coating layer can be coated onto one surface of the fabric layers (L1, L2). "The coating layer is coated onto one surface of the fabric layer" means that a film (coating layer) by the coating layer forming material is formed on the surface of the fabric layer (and/or fiber forming the fabric layer).

The resin used for the coating may be, for example, a silicone resin or a urethane resin. However, the coating resin is not limited thereto.

The method of forming the coating layer is not particularly limited. For example, the coating agent or coating composition may be coated onto the surface of the fabric layer by using the coating methods such as knife coating, doctor blade coating, a spray coating, or dip coating.

In one embodiment, the coating layer may be formed on both sides or one side of the fabric layers (L1, L2). For example, the coating layer can be coated onto one surface (i.e., the inside surface) of the fabric layer L1 and the fabric layer L2 facing each other. Alternatively, the coating layer may be formed on the surface opposite to the inside surface of the fabric layers (L1, L2), that is, on the outside surface of each of the fabric layers (L1, L2). In yet another embodiment, a coating layer may be formed on both the outside surface and the inside surface of the fabric layers (L1, L2).

In one embodiment, the protrusion pattern (P3) may be formed on a surface opposite to the fabric layer surface on which the resin coating layer is formed. Specifically, when the resin coating layer is coated onto the outside surface of the fabric layer, the protrusion pattern (P3) may be formed on the inside surface of at least one of the fabric layers (L1, L2).

In one embodiment, the coating amount of the resin coating layer may be 30 to 150 g/m². Specifically, the lower limit of the coating amount may be, for example, 35 g/m² or more, 40 g/m² or more, 45 g/m² or more, or 50 g/m² or more, and the upper limit thereof may be, for example, 140 g/m² or less, 130 g/m² or less, 120 g/m² or less, 110 g/m² or less, 100 g/m² or less, 90 g/m² or less, 80 g/m² or less, 70 g/m² or less, 60 g/m² or less, or 50 g/m² or less. When the coating amount is less than the above range, the ventilation volume of the airbag is large and thus, it is difficult to maintain the inflated state for more than 5 seconds at a constant pressure after the airbag is deployed. Further, when the coating amount exceeds the above range, the airbag becomes too thick and thus the storability is not good, and it is difficult for the airbag to exert its original function while coming into contact with the structure when the airbag is deployed. The coating amount can be measured according to ISO 3801, but is not particularly limited thereto.

In one embodiment, the weight (g/m²) of the two-layer fabric on which the resin coating layer is formed may be 450 g/m² or less. Specifically, the upper limit of the weight of the coated fabric may be, for example, 400 g/m² or less, or 350 g/m² or less, more specifically, 340 g/m² or less, 330 g/m² or less, 320 g/m² or less, 310 g/m² or less, or 300 g/m² or less. Further, the lower limit thereof may be, for example, 280 g/m² or more, 290 g/m² or more, 300 g/m² or more, or 310 g/m² or more. When the weight of the coated two-layer fabric exceeds the above upper limit, it may be difficult to reduce the weight, and the manufacturing cost of the fabric may increase. Further, when the weight of the coated two-layer fabric is less than the above lower limit, the mechanical properties may deteriorate. The weight of the coated fabric can be measured according to ISO 3801, but is not particularly limited thereto.

In one embodiment, the thickness of the two-layer fabric on which the resin coating layer is formed may be in the range of 0.30 to 0.55 mm. Specifically, the lower limit of the thickness may be 0.31 mm or more, 0.32 mm or more, 0.33 mm or more, 0.34 mm or more, or 0.35 mm or more, and the upper limit thereof may be, for example, 0.50 mm or less, 0.49 mm or less, 0.48 mm or less, 0.47 mm or less, 0.46 mm or less, 0.45 mm or less. When the thickness is the lower limit of the above range, it is difficult to secure sufficient mechanical properties, and when the thickness exceeds the above range, the foldability is poor. The thickness can be measured according to ISO 2286-3, but is not particularly limited thereto.

The use of the two-layer fabric is not particularly limited. For example, it can be used for applications such as life jackets or airbags that require gas inflation.

In yet another embodiment according to the present application, there is provided a method for producing a two-layer fabric having the above configuration.

In one embodiment, the production method of the two-layer fabric comprises simultaneously weaving a first fabric layer (L1) and a second fabric layer (L2) separated from each other using one-piece woven (OPW) process, and forming a protrusion pattern (P3) integrally formed with the fabric layers on the surface of at least one of the fabric layers (L1, L2). At this time, the method can form the protrusion pattern (P3) in an interval size of 5 to 100 threads. The threads refer to one line (or a strand) of the warp and weft threads forming the patterns (P1, P2) of the fabric layers (L1, L2).

The details concerning the shape of the patterns P1, P2 and P3, the position of the protrusion pattern (P3), the fibers (weft and warp) used for weaving, the coating, and other two-layer fabric and its production are the same as described above, and thus a description thereof will be omitted.

In one embodiment, the method may form 1 or 2 or more protrusion patterns P3 on the surface of the fabric layer at intervals of at least 5 to 100 threads (or in a size that occupies the intervals). The specific thread interval is the same as described above.

In one embodiment, the method may repeatedly form the protrusion pattern (P3) on the surface of the fabric layer at intervals of at least 5 to 50 threads. The specific thread interval, i.e., the interval between the protrusion patterns, is the same as described above.

In one embodiment, the method can form the patterns (P1, P2) of the fabric layers (L1, L2) with warp and weft densities in the range of 40 to 80 th/inch. The specific density is as described above.

In one embodiment, the method can form the protrusion pattern (P3) with a warp and weft density of 20 th/inch or less, 15 th/inch or less, 10 th/inch or less, or 5 th/inch or less. The specific density is as described above.

In one embodiment, the method may further include coating and curing a resin coating composition (or coating formulation) onto one surface of the fabric layers (L1, L2).

In one embodiment, curing may be performed at room temperature or higher. The room temperature is a temperature in a state where temperature increase or temperature decrease is not particularly performed, and mean a temperature of about 15 to 35° C. Further, the temperature greater than or equal to the room temperature is a temperature at which temperature increase is performed, and may mean a temperature exceeding 35° C., for example, a temperature in the range of 40 to 300° C. The curing time at that temperature is not particularly limited, and the curing may be performed, for example, for several seconds (sec) to several tens of minutes (min).

In another embodiment according to the present application, there is provided an article comprising the two-layer fabric. The type of the article is not particularly limited, but may be, for example, a life jacket or an airbag.

Advantageous Effects

According to the present application, a gas inflatable two-layer fabric that is improved in impact durability and tear strength while being excellent in storability, and further is excellent the weaving efficiency and manufacturing processability can be provided. In addition, the present application can provide an article (e.g., airbag, a life jacket, etc.) including the gas inflatable two-layer fabric as described above.

BRIEF DESCRIPTION OF THE DRAWING

FIG. 1 schematically depicts a two-layer fabric that can be used for an airbag according to an embodiment of the present application. As shown in the figure, the two-layer fabric can form a non-inflation part (A), an inflation part (B) and a joint part (C).

FIG. 2 is a photograph of the surface of the fabric layers (L1, L2) and the protrusion pattern (P3) according to an embodiment of the present application. Specifically, FIG. 2a is an image of a state in which a plurality of protrusion patterns (P3) are formed on an inside surface of the first fabric layer 10, among the surfaces (uncoated surface as an inside surface) facing each other of the first fabric layer (L1) 10 and the second fabric layer (L2) 20. And, FIG. 2b is an enlarged photograph of the protrusion pattern (P3), which shows a piece of protrusion pattern 30 formed while occupying a predetermined area with a predetermined thread interval size (e.g., 5 to 100 thread interval size). On the other hand, FIG. 2c is an image of the coating surface, which is a surface opposite to the inside surface of the fabric layer on which the protrusion pattern (P3) is formed.

FIG. 3 is an image for explaining a mesh-shaped protrusion pattern formed on the surface of the fabric layer. Specifically, FIG. 3a is an image obtained by photographing the pattern (P1 or P2) of the fabric layer (L1 or L2), and FIG. 3b is an image obtained by photographing a mesh-shaped protrusion pattern (P3) formed on the fabric layer pattern (P1 or P2) of FIG. 3a. At this time, in the embodiment of FIG. 3b, the density of the fabric layer pattern is 57×48 th/inch, and the density of the protrusion pattern is 8×10 th/inch. One protrusion pattern is sized to occupy 36 thread intervals in the weft and warp directions, and each protrusion pattern can be formed separately at an interval of 8 threads in the weft and warp directions.

FIG. 4 is a view for explaining a puncture test described later.

FIG. 5 is a view for explaining a tear strength test described later.

DETAILED DESCRIPTION OF THE EMBODIMENTS

Hereinafter, the action and effect of the invention will be described in more detail with reference to specific examples of the invention. However, these examples are presented for illustrative purposes only and the scope of the invention is not limited thereby in any way.

EXAMPLE AND COMPARATIVE EXAMPLE

Example 1

A two-layer fabric was prepared by the OPW weaving process using a jacquard machine. The fiber used in preparing the two-layer fabric was a PET fiber (Secura-Stelen®) by Kolon, and the pattern (P1) of the first fabric layer and the pattern (P2) of the second fabric layer were each woven into a 1×1 plain weave. At this time, the protrusion pattern as shown in FIG. 3b was formed on the inside surface of the first fabric layer (i.e., the inside surface of the first fabric layer facing one surface of the second fabric layer).

Then, the outside surface of each fabric layer was coated with a urethane resin (using Covestro DLU coating agent) (coating amount of 38 g/m²), and then cured at a temperature of 80 to 180° C. for about 1.5 minutes in a hot air chamber.

The thickness of the coated two-layer fabric prepared as above was 0.43 mm, and the total weight was 302 g/m².

Comparative Example 1

A coated fabric was prepared in the same manner, except that the protrusion pattern P3 was not formed on the inside surface of the two-layer fabric.

The thickness of the coated two-layer fabric prepared as above was 0.37 mm, and the total weight was 297 g/m².

Comparative Example 2

A coated fabric was prepared in the same manner, except that the protrusion pattern (P3) was not formed on the inside surface of the two-layer fabric and the outside surface of each fabric layer was coated with silicone resin (Dow Corning DC3760 coating agent was used) (coating amount of about 75 g/m²).

The thickness of the coated two-layer fabric prepared as above was 0.36 mm, and the total weight was 340 g/m².

Experiment 1: Evaluation of Mechanical Properties

1. Puncture Test (Puncture Force, N)

The physical properties of the fabric were evaluated according to ASTM F1342. Specifically, the fabrics prepared in Examples and Comparative Examples were fixed to an ASTM F1342 Puncture Strength measuring jig, and then Probe A was penetrated into the Puncture Guide Hole of the jig at a rate of 50.8 cm/min. Then, the load and the degree of elongation when the puncture occurred in the fabric were measured. ASTM F1342 Puncture Strength Measurement Jig and Probe A were manufactured according to the standard shown in FIG. 4.

2. Tear Strength Test (Tear Force, N)

The properties of the fabric were evaluated according to ISO 13937-2. Specifically, the fabrics prepared in Examples and Comparative Examples were cut into trouser-shaped specimens as shown in FIG. 5a (unit: cm), and both legs of the sample are tensioned at a speed of 100 mm/min in up and down direction. At this time, a Tear Strength graph according to time could be obtained as shown in FIG. 5b. The peaks of this graph were divided into 4 equal parts from the start to the end, and then the arithmetic mean of a total of 16 numerical values, including 2 maximum peaks and 2 minimum peaks, were calculated for each equal parts, thereby calculating the tear strength. The experimental results are shown in Table 1 below.

TABLE 1

|  |  | Example 1 | Comparative Example 1 | Comparative Example 2 |
|---|---|---|---|---|
| Puncture force (N) |  | 45.3 | 41.0 | 27.1 |
| Tear force (N) | Warp direction | 344.4 | 227 | 290 |
|  | Fill direction | 546.36 | 245 | 280 |

Experiment 2: Evaluation of Thickness, Weight and Foldability

When folding the fabric, the thickness can vary depending on the size and shape of the fabric. Thus, Example 2 and Comparative Example 3 were constructed using fabrics of the same shape and specification. Specifically, for the specimens of Example 2 and Comparative Example 3, the same polyurethane coating material was coated onto the same fabric (using PET 550 dtex/144f, OPW fabric having the weft and warp density of 57×48 th/in was produced) in the same amount (about 35 gsm). At this time, the fabric has a rectangular sheet shape, and the area is A.

However, in the case of Example 2, a protrusion pattern (8×10 th/in (weft×warp) density) occupied by 36 threads in the weft and warp directions was formed on the fabric, and the protrusion pattern as described above was repeatedly positioned at intervals of 20 threads in the weft and warp directions, so that it was evenly formed on a partial area (a) of the fabric area (A) (1 layer). Further, in the case of Comparative Example 3, a reinforcement fabric occupying an area (a) (manufactured in the same manner as the prepared fabric, only the area is different) was backed onto the prepared fabric (2 layers).

The thickness, weight, and foldability of Example 2 and Comparative Example 3 were evaluated (arithmetic mean value for 5 measurements) as follows.

TABLE 2

|  | Example 2 | Comparative Example 3 |
|---|---|---|
| Roll folding | 89 mm | 100 mm |
| Thickness | 0.43 mm | 0.72 mm |
| Weight | 302 g/m² | 545 g/m² |

* Roll folding: Each specimen is rolled up from one end to form a cylindrical shape, and the circumference of the central part is measured.
* Thickness: The thickness of each specimen
* Weight: The weight per unit area of each specimen.

The invention claimed is:

1. A two-layer fabric comprising:
a first fabric layer (L1) having a predetermined pattern (P1); and a second fabric layer (L2) having a predetermined pattern (P2),
wherein a protrusion pattern (P3) integrally formed with the fabric layer is formed on the surface of at least one of the fabric layers (L1, L2),
wherein the protrusion pattern (P3) is formed in a size that occupies an interval of 5 to 100 threads,
wherein the protrusion pattern (P3) is formed seperately at intervals of 5 to 50 threads,
provided that the threads refer to a strand of warp and weft threads forming the patterns (P1, P2) of the fabric layers (L1, L2), and
wherein the protrusion pattern has a mesh shape.

2. The two-layer fabric according to claim 1, wherein:
the pattern (P1) of the fabric layer (L1) and the pattern (P2) of the fabric layer (L2) are the same as or different from each other.

3. The two-layer fabric according to claim 1, wherein:
the pattern (P1) of the fabric layer (L1) and the pattern P2 of the fabric layer L2 are each independently a 1×1 weave, a 2×2 weave, a 3×3 weave, a satin weave, a warp rib weave, a weft rib weave, or its mixed weave.

4. The two-layer fabric according to claim 1, wherein:
the density of the warp and weft threads forming the patterns (P1, P2) of the fabric layers (L1, L2) is 40 to 80 th/inch.

5. The two-layer fabric according to claim 1, wherein:
the density of warp and weft threads forming the protrusion pattern (P3) is 20 th/inch or less.

6. The two-layer fabric according to claim 1, wherein:
the patterns P1, P2 and P3 are formed of at least one fiber selected among a polyester fiber, a nylon fiber, an aramid fiber, a polyketone fiber, a carbon fiber and a cellulose fiber.

7. The two-layer fabric according to claim 6, wherein:
the fiber has a fineness of 300 to 1500 dtex.

8. The two-layer fabric according to claim 1,
which further comprises a coating layer formed on one surface of the fabric layers (L1, L2),
wherein the resin coating layer comprises at least one of silicone and urethane resin.

9. The two-layer fabric according to claim 8, wherein:
the protrusion pattern (P3) is formed on another one surface opposite to the one surface on which the resin coating layer is formed.

10. The two-layer fabric according to claim 8, wherein:
a coating amount of the resin coating layer is in the range of 30 to 150 g/m².

11. A method for producing a two-layer fabric, comprising:
simultaneously weaving a first fabric layer (L1) and a second fabric layer (L2) separated from each other using one-piece woven (OPW) process, and forming a protrusion pattern (P3) integrally formed with the fabric layers on the surface of at least one of the fabric layers (L1, L2),
wherein the protrusion pattern (P3) is formed in a size that occupies an interval of 5 to 100 threads,
wherein the protrustion pattern (P3) is formed seperately at intervals of 5 to 50 threads,
provided that the threads refer to a strand of warp and weft threads forming the patterns (P1, P2) of the fabric layers (L1, L2), and
wherein the protrusion pattern (P3) is formed in a mesh shape.

12. An article comprising the two-layer fabric according to claim 1.

\* \* \* \* \*